R. M. BEMIS.
FISH GAFF.
APPLICATION FILED MAR. 28, 1913.

1,085,843.

Patented Feb. 3, 1914.

Witnesses
R. N. Jones.
L. G. Ellis.

Inventor
Roscoe M. Bemis,

By
Attorney.

UNITED STATES PATENT OFFICE.

ROSCOE M. BEMIS, OF ATHOL, MASSACHUSETTS.

FISH-GAFF.

1,085,843.  Specification of Letters Patent.  Patented Feb. 3, 1914.

Application filed March 28, 1913. Serial No. 757,455.

*To all whom it may concern:*

Be it known that I, ROSCOE M. BEMIS, a citizen of the United States, residing at Athol, in the county of Worcester and State of Massachusetts, have invented certain new and useful Improvements in Fish-Gaffs; and I do hereby declare the following to be a full, clear, and exact description of the invention, such as will enable others skilled in the art to which it appertains to make and use the same.

This invention comprehends improvements in fish gaffs or spears, and relates more particularly to those which are especially adapted for use in landing a fish.

The primary object of the invention is to provide a device of this nature which will be of extremely simple construction, cheap to manufacture, and which will securely hold a fish without materially injuring or mutilating it.

Another and more specific object of the invention is to provide a fish gaff formed of two rods bent so as to form a handle, guide hooks and prongs adapted to coöperate with said guide hooks to securely hold a fish.

With these and other objects in view, as will become more apparent as the description proceeds, the invention consists in certain novel features of construction, combination and arrangement of parts as will be hereinafter fully described and claimed.

Figure 1:
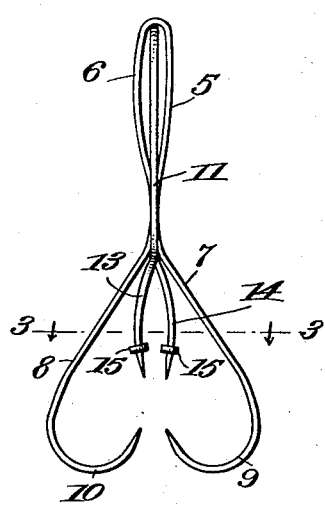
Figure 2:
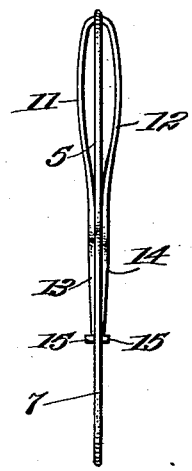
Figure 3:
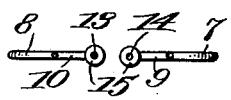

For a complete understanding of my invention reference is to be had to the following description and accompanying drawings, in which, Figure 1 is a side elevation of a fish gaff constructed in accordance with my invention; Fig. 2 is an edge elevation of the same; and Fig. 3 is a section taken on the plane of line 3—3 of Fig. 1.

In the preferred embodiment of my invention, a spring rod is bent centrally of its ends to form the converging handle sections 5 and 6, then extended in opposite directions from the point of convergency to form shanks 7 and 8, and finally extended laterally and upwardly to form the hooks 9 and 10. A second wire rod is bent centrally of its ends to form the handle sections 11 and 12, which are disposed in a plane at right angles to the plane of the first mentioned handle sections and which converge, as clearly shown in Fig. 2, so as to contact the handle sections 5 and 6 adjacent their point of convergency. The various handle sections are welded or otherwise secured to one another adjacent their lower ends so as to form a strong and comparatively rigid handle. Bowed prongs 13 and 14 are formed upon the lower ends of the handle sections 11 and 12, respectively, and terminate directly above, and in spaced relationship to, the extremities of the guide hooks 9 and 10. These prongs are disposed in the same plane as the guide hooks, as clearly shown in Fig. 3, and are provided with stops 15 which prevent them penetrating a fish to an undue distance.

The rod, of which the hooks 9 and 10 form a part, is made of spring metal so that, when said hooks are forced against a fish, they will separate so as to permit the prongs 13 and 14 piercing a fish. It will thus be seen that my improved fish gaff may be easily handled so as to securely land a fish. It will be noted that the construction and shape of the shanks 7, 8 and hooks 9, 10 is such as to cause the latter to effectually guide the gaff so as to properly engage the prongs 13 and 14 with the fish. When it is desired to remove a fish from the gaff, the hooks 9 and 10 may be easily sprung apart to permit a performance of the desired operation.

What is claimed is:

1. A fish gaff formed of two resilient rods, said rods being bent intermediate their ends to provide handle sections, outwardly diverging shanks extending from the outer ends of certain of said handle sections, inwardly facing hooks formed upon the extremities of said shanks, said hooks being spaced from each other, prongs formed upon the extremities of the other of said handle sections and terminating in spaced relationship to the guide hooks, and annular stops carried by said prongs to limit the thrust of said prongs.

2. A fish gaff consisting of a plurality of resilient rods, said rods bent centrally of their ends, converging and engaging each other intermediate their ends and forming elongated handle portions, said handle portions disposed at right angles to each other, one of said rods bowed from its converging point and bent inwardly toward the handle portions at its free terminals, the other of said rods bowed from its converging point and terminating in spaced prongs, and an annular projection formed on said prongs near the free ends thereof to prevent said prongs from penetrating the fish an undue distance.

In testimony whereof I affix my signature in presence of two witnesses.

ROSCOE M. BEMIS.

Witnesses:
 ISAAC GLASER,
 WM. M. WELCH.

Copies of this patent may be obtained for five cents each, by addressing the "Commissioner of Patents, Washington, D. C."